United States Patent
Malyshev

(10) Patent No.: US 12,137,795 B2
(45) Date of Patent: Nov. 12, 2024

(54) PORTABLE MAGNETIC HOLDER

(71) Applicant: Malyshev Maksym, Bayshore, NY (US)

(72) Inventor: Maksym Malyshev, Islip, NY (US)

(*) Notice: Subject to any disclaimer, the term of this patent is extended or adjusted under 35 U.S.C. 154(b) by 156 days.

(21) Appl. No.: 18/100,564

(22) Filed: Jan. 23, 2023

(65) Prior Publication Data
US 2023/0232971 A1 Jul. 27, 2023

Related U.S. Application Data

(60) Provisional application No. 63/301,761, filed on Jan. 21, 2022.

(51) Int. Cl.
*A47G 23/02* (2006.01)
*A45F 5/10* (2006.01)
*F16M 13/02* (2006.01)

(52) U.S. Cl.
CPC ............ *A45F 5/10* (2013.01); *A47G 23/0225* (2013.01); *A45F 2005/1086* (2013.01); *A45F 2200/0583* (2013.01); *F16B 2200/83* (2023.08); *F16M 13/022* (2013.01)

(58) Field of Classification Search
CPC .......... F16B 2200/83; F16B 2001/0035; H01F 7/0252; F16M 13/022; B60R 2011/0057; A47G 23/0225
USPC ...... D7/619.1, 620, 622; D3/202; 248/311.2, 248/218.4, 219.4, 213.2, 206.5; 224/562
See application file for complete search history.

(56) References Cited

U.S. PATENT DOCUMENTS

| | | | | |
|---|---|---|---|---|
| 3,556,341 | A * | 1/1971 | Rains | A47G 23/0225 D7/510 |
| 5,313,754 | A * | 5/1994 | Jensen | E04F 19/02 52/287.1 |
| 5,409,190 | A * | 4/1995 | Mattox | A47C 7/68 248/315 |
| 5,497,902 | A * | 3/1996 | Crock | A47G 23/0216 220/737 |
| D373,707 | S * | 9/1996 | Seaburg | D7/536 |
| D396,780 | S * | 8/1998 | Villarreal, Jr. | D7/619.1 |
| D400,678 | S * | 11/1998 | Clark | D34/27 |
| 6,193,202 | B1 * | 2/2001 | Rogers | B60N 3/103 248/312.1 |
| 6,279,885 | B1 * | 8/2001 | Leon, Jr. | B25B 11/002 269/902 |
| D514,896 | S * | 2/2006 | Wickenhauser | D7/619.1 |

(Continued)

*Primary Examiner* — Justin M Larson
(74) *Attorney, Agent, or Firm* — Aasheesh V. Shravah; CM Law

(57) ABSTRACT

Exemplary embodiments of a portable accessory holder are provided. The apparatus can include a housing having a top portion, a bottom portion, a front portion, a rear portion, a first side and a second side, and a hinge provided on the front portion. The hinge can include a first leaf secured to the front portion of the housing, the first leaf having a first side and a second side opposite the first side, a second leaf rotatably secured to the first side of the first leaf, the second leaf including a magnet, the second leaf being configured to rotate away from the first leaf and against the front portion of the housing, and a third leaf rotatably secured to the second side of the first leaf, the third leaf including a magnet, the third leaf being configured to rotate away from the first leaf and against the front portion of the housing.

17 Claims, 8 Drawing Sheets

(56) References Cited

U.S. PATENT DOCUMENTS

| | | | | |
|---|---|---|---|---|
| 8,001,671 | B2 * | 8/2011 | Mitchell | A47G 23/0225 |
| | | | | 29/469 |
| D762,980 | S * | 8/2016 | Aller | D3/304 |
| D804,394 | S * | 12/2017 | Bergin | D12/419 |
| 9,939,104 | B2 * | 4/2018 | Smith | F16M 13/022 |
| D848,932 | S * | 5/2019 | Henderson | D12/419 |
| 10,307,006 | B2 * | 6/2019 | Knoll | B67B 7/16 |
| 10,627,043 | B2 * | 4/2020 | Wargo | H01Q 1/12 |
| D896,589 | S * | 9/2020 | Smith | D7/536 |
| 11,019,898 | B2 * | 6/2021 | Ripple | A47G 23/0241 |
| 11,147,419 | B2 * | 10/2021 | Yurkovetskaya | A47J 45/02 |
| D947,622 | S * | 4/2022 | Sutton | D7/622 |
| 11,382,443 | B2 * | 7/2022 | Priefert | B65D 25/22 |
| 11,459,162 | B2 * | 10/2022 | Adjeleian | B65D 23/003 |
| D974,122 | S * | 1/2023 | Lee | D7/620 |
| 2003/0047578 | A1 * | 3/2003 | Barnett | B60N 3/103 |
| | | | | 224/901.8 |
| 2004/0084593 | A1 * | 5/2004 | Barfield | B25H 3/04 |
| | | | | 248/311.2 |
| 2005/0056646 | A1 * | 3/2005 | Gary | B65D 25/24 |
| | | | | 220/483 |
| 2005/0167457 | A1 * | 8/2005 | Barnett | B60N 3/103 |
| | | | | 224/183 |
| 2013/0068709 | A1 * | 3/2013 | Liu | B25H 3/04 |
| | | | | 211/70.6 |
| 2014/0124632 | A1 * | 5/2014 | Bouse | A24F 19/0092 |
| | | | | 248/205.1 |
| 2016/0052462 | A1 * | 2/2016 | Heilgendorf | B60R 7/08 |
| | | | | 224/274 |
| 2016/0061380 | A1 * | 3/2016 | Smith | B25H 3/00 |
| | | | | 248/206.5 |
| 2019/0014935 | A1 * | 1/2019 | Bergin | A47G 23/02 |

* cited by examiner

PORTABLE MAGNETIC HOLDER

CROSS-REFERENCE TO RELATED APPLICATIONS

This application relates to and claims priority from U.S. Provisional Patent Application Ser. No. 63/301,761 filed Jan. 21, 2022, the entire disclosure of which is hereby incorporated herein by reference.

FIELD OF THE DISCLOSURE

The present disclosure relates to exemplary embodiments of a portable magnetic holder, and more particularly, to exemplary embodiments of a portable magnetic holder for holding various accessories.

BACKGROUND INFORMATION

When users go to certain facilities or locations, e.g., a gym, exercise facility or pool, they have accessories they are not able to carry while performing certain activities. Usually, they put these accessories (e.g., phone, beverage container, keys) on the floor or other surface that has germs. When the users pick up these devices, these germs are spread to them and often other users who they are in contact with. Therefore, there is a need for an apparatus that can hold these accessories while the user performs the activities.

SUMMARY OF EXEMPLARY EMBODIMENTS OF THE DISCLOSURE

Exemplary embodiments of the present disclosure can provide for a portable accessory holder. In some exemplary embodiments, an apparatus can be provided, the apparatus comprising a housing having a top portion, a bottom portion, a front portion, a rear portion, a first side and a second side; and a hinge provided on the front portion, the hinge comprising a first leaf secured to the front portion of the housing, the first leaf having a first side and a second side opposite the first side; a second leaf rotatably secured to the first side of the first leaf, the second leaf including a magnet, the second leaf being configured to rotate away from the first leaf and against the front portion of the housing; and a third leaf rotatably secured to the second side of the first leaf, the third leaf including a magnet, the third leaf being configured to rotate away from the first leaf and against the front portion of the housing; wherein the magnet on the second leaf and the magnet on the third leaf cause the second leaf and third leaf to rotate outward and away from the front portion of the housing when the first leaf is placed against a magnetic surface.

In some exemplary embodiments, the apparatus further comprises a magnet provided on the first leaf. In some exemplary embodiments, the apparatus further comprises one or more screws to secure the magnet on the second leaf to the second leaf; and one or more screws to secure the magnet on the third leaf to the third leaf. In some exemplary embodiments, the apparatus further comprises one or more screws to secure the magnet on the first leaf to the first leaf and secure the hinge to the front portion of the housing.

In some exemplary embodiments, the magnets on the first leaf, second leaf and third leaf are provided in a similar polarity orientation with respect to the front portion of the housing, such that the magnet on the second leaf and third leaf is repelled against the magnet on the first leaf. In some exemplary embodiments, the magnets on the first leaf, second leaf and third leaf are each orientated such that a north polarity faces outward and a south polarity is facing the front portion of the housing. In some exemplary embodiments, the magnets on the first leaf, second leaf and third leaf are each orientated such that a south polarity faces outward and a north polarity is facing the front portion of the housing. In some exemplary embodiments, when the first leaf is placed against a magnetic surface, the magnetic attraction of the magnet on the second leaf and the magnet on the third leaf to the magnetic surface causes the second leaf and third leaf to rotate outward and away from the front portion of the housing, securing the apparatus to the magnetic surface.

In some exemplary embodiments, the apparatus further comprises a first spring-loaded mechanism provided between the first leaf and second leaf configured to rotate the second leaf inwards toward the front portion of the housing; and a second spring loaded mechanism provided between the third leaf and second leaf configured to rotate the third leaf inwards toward the front portion of the housing. In some exemplary embodiments, the magnet on the second leaf and the magnet on the third leaf cause the second leaf and third leaf to rotate outward and away from the front portion of the housing when the first leaf is placed against a magnetic surface. In some exemplary embodiments, when the first leaf is placed against a magnetic surface, the magnetic attraction of the magnet on the second leaf to the magnetic surface is greater than the force of the first spring-loaded mechanism, and the magnetic attraction of the magnet on the third leaf to the magnetic surface is greater than the force of the second spring-loaded mechanism, causing the second leaf and third leaf to rotate outward and away from the front portion of the housing, securing the magnet on the second leaf and the magnet on the third leaf to the magnetic surface.

In some exemplary embodiments, the apparatus further comprises a first compartment provided on the first side of the housing; and a second compartment provided on the second side of the housing. In some exemplary embodiments, the apparatus further comprises a recess on the top portion of the housing configured to receive a beverage container. In some exemplary embodiments, the apparatus further comprises a handle secured to the rear portion of the housing, the handle configured to lift the apparatus. In some exemplary embodiments, the apparatus further comprises a frame provided around the hinge that is raised outward from the front portion of the housing such that the hinge is recessed within the frame. In some exemplary embodiments, the apparatus further comprises a magnet threadably connected to the bottom portion of the housing. In some exemplary embodiments, the apparatus further comprises a rubber padding provided around the magnet on the second leaf and the magnet on the third leaf.

BRIEF DESCRIPTION OF THE DRAWINGS

The foregoing and other objects of the present disclosure will be apparent upon consideration of the following detailed description, taken in conjunction with the accompanying drawings, and claims, in which like reference characters refer to like parts throughout, and in which:

Figure 1:
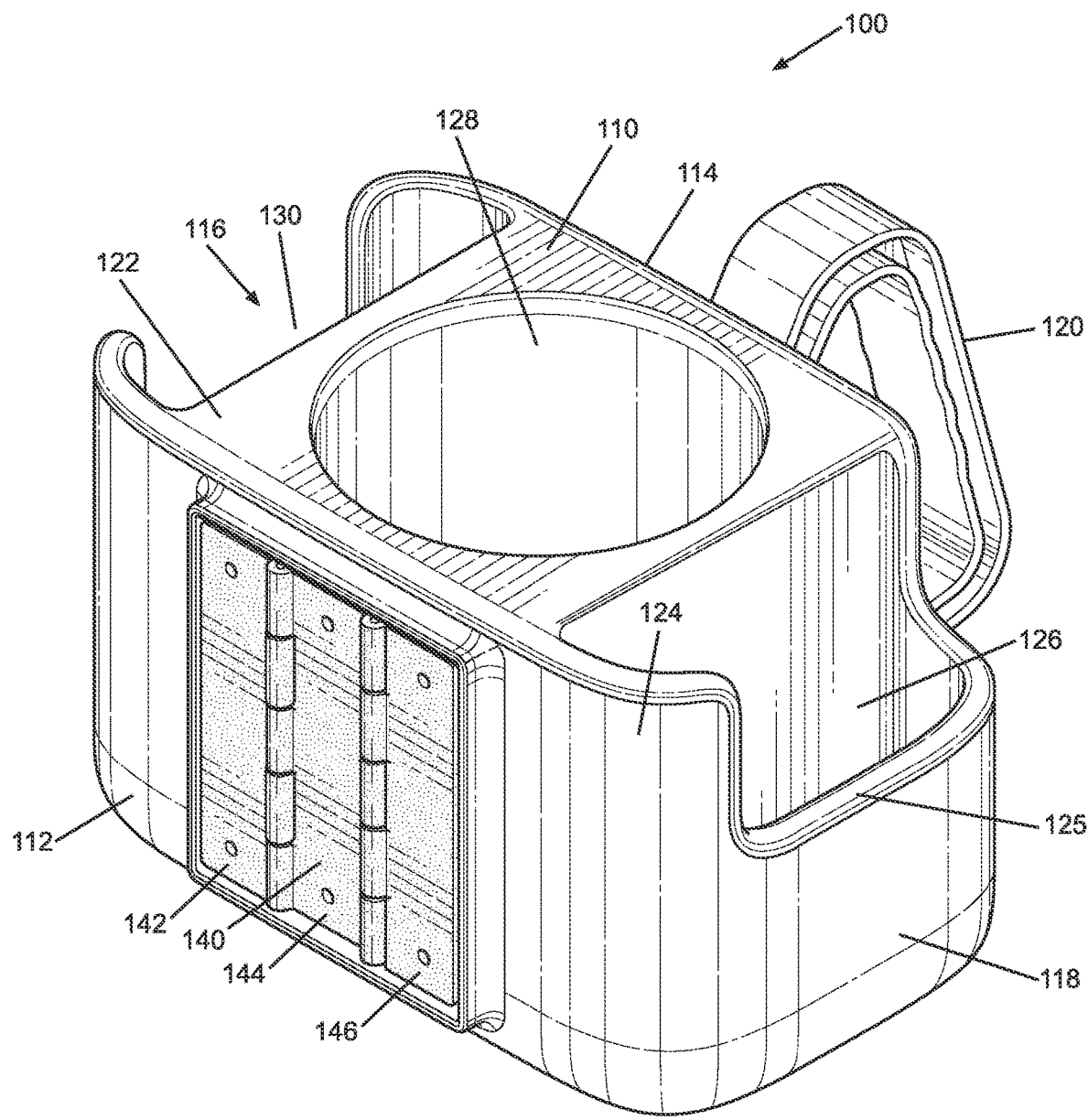
FIG. 1 illustrates a front top perspective view of a portable accessory holder according to an exemplary embodiment of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure.

DETAILED DESCRIPTION OF EXEMPLARY EMBODIMENTS OF DISCLOSURE

The exemplary embodiments of the present disclosure can provide for a portable magnetic holder that can easily be attached to any magnetic surface to hold personal belongings, such as a mobile phone, headphones, beverage container and keys. Exemplary embodiments of the various methods and apparatuses will now be described with reference to the figures. The following description of the various embodiments is merely exemplary in nature and is in no way intended to limit the scope of the disclosure, its application, or uses.

Figure 2:
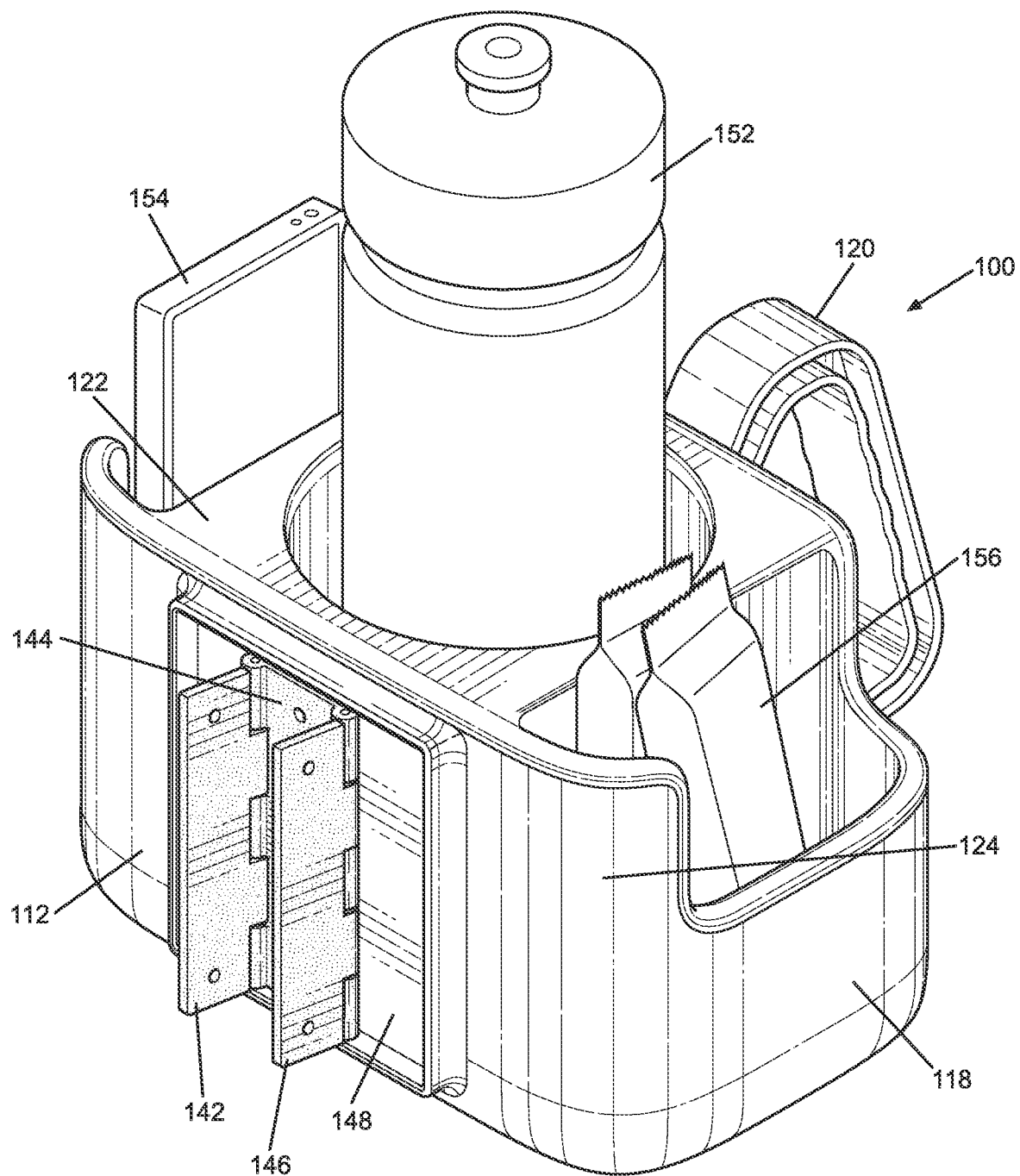
FIG. 2 illustrates a front top perspective view of a portable accessory holder according to an exemplary embodiment of the present disclosure.
Figure 3:
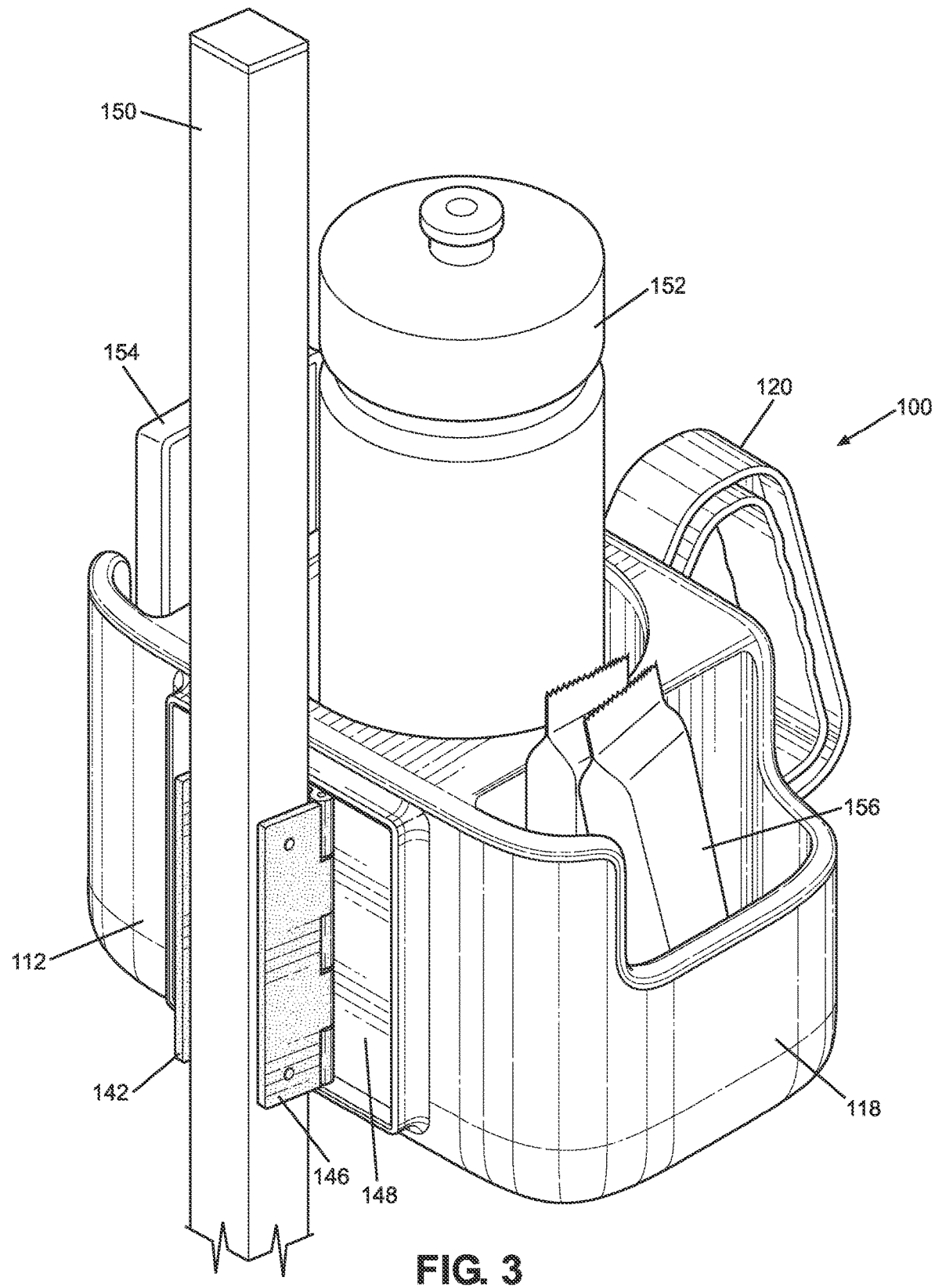
FIG. 3 illustrates a bottom rear perspective view of a portable accessory holder according to an exemplary embodiment of the present disclosure.

As shown in FIGS. 1-3, a portable accessory holder 100 can have a housing 110 that can be constructed from various materials, such as but not limited to plastic, metal, wood or any composites thereof. The housing 110 can have a front portion 112, a rear portion 114, a first side 116, a second side 118, a top portion 122 and a bottom portion 132. The front portion 112 can have a three-leaf hinge 140, that can have three leaves 142, 144 and 146. The three-leaf hinge 140 can be provided within a frame 182 that protrudes outward of the front portion 112 of the housing 110. As shown in FIG. 2, a back wall 148 is provided within the frame 182, that can be flush with the front portion 112 of the housing 110. In some exemplary embodiments, the back wall 148 can be the same surface as the front portion 112 of the housing 110. A middle leaf 144 can be rotatably connected to a first side leaf 142 on one side and rotatably connected to a second side leaf 146 on the opposite side. A rear portion 114 can have a handle 120 for carrying the portable accessory holder 120.

The top portion 122 can have a recess 128 such as but not limited to a circular recess, for holding a beverage container 152 or other types of beverage holders such as cans, liquid bottles, cocktail shaker or coffee mugs, as shown in FIG. 2. An internal portion of the recess 128 can be constructed of rubber, similar to the housing 100, for providing better traction and more secure positioning of the beverage container 152 within the recess 128. A bottom portion of the recess 128 can be provided with padding for additional security of the beverage container 152 within the recess 128.

The first side 116 of the housing 110 can have a compartment 130 for holding an accessory such as but not limited to a mobile device 154. The compartment 130 can have a cutaway portion 133 that can allow a user to always have a substantial part of the mobile device 154 visible such as a touch screen portion or display. An internal portion of the compartment 130 can be constructed of rubber, similar to the housing 100, for providing better traction and more secure positioning of a mobile device 154 inside the compartment 130. A bottom portion of the compartment 130 can be provided with padding for additional security of the accessory within the compartment 130.

The second side 118 can have a compartment 126 for holding other accessories, such as a snack 156, or earphones, keys, money, credit cards or other accessories. The compartment 126 can have a cutaway portion 125 that allows access to the accessory holder having a height between the top portion 122 and bottom portion 132. The compartment 126 can have a raised wall 124 that extends from the front portion 112 and turns inward into the second side 118. The raised wall 124 can provide additional security for the accessory within the compartment 126, such as for the snack 156 so that it does not fall out of the compartment 126. An internal portion of the compartment 126 can be constructed of rubber, similar to the housing 100, for providing better traction and more secure positioning of the accessory within the compartment 126. A bottom portion of the compartment 126 can be provided with padding for additional security of the accessory within the compartment 126.

Figure 4:
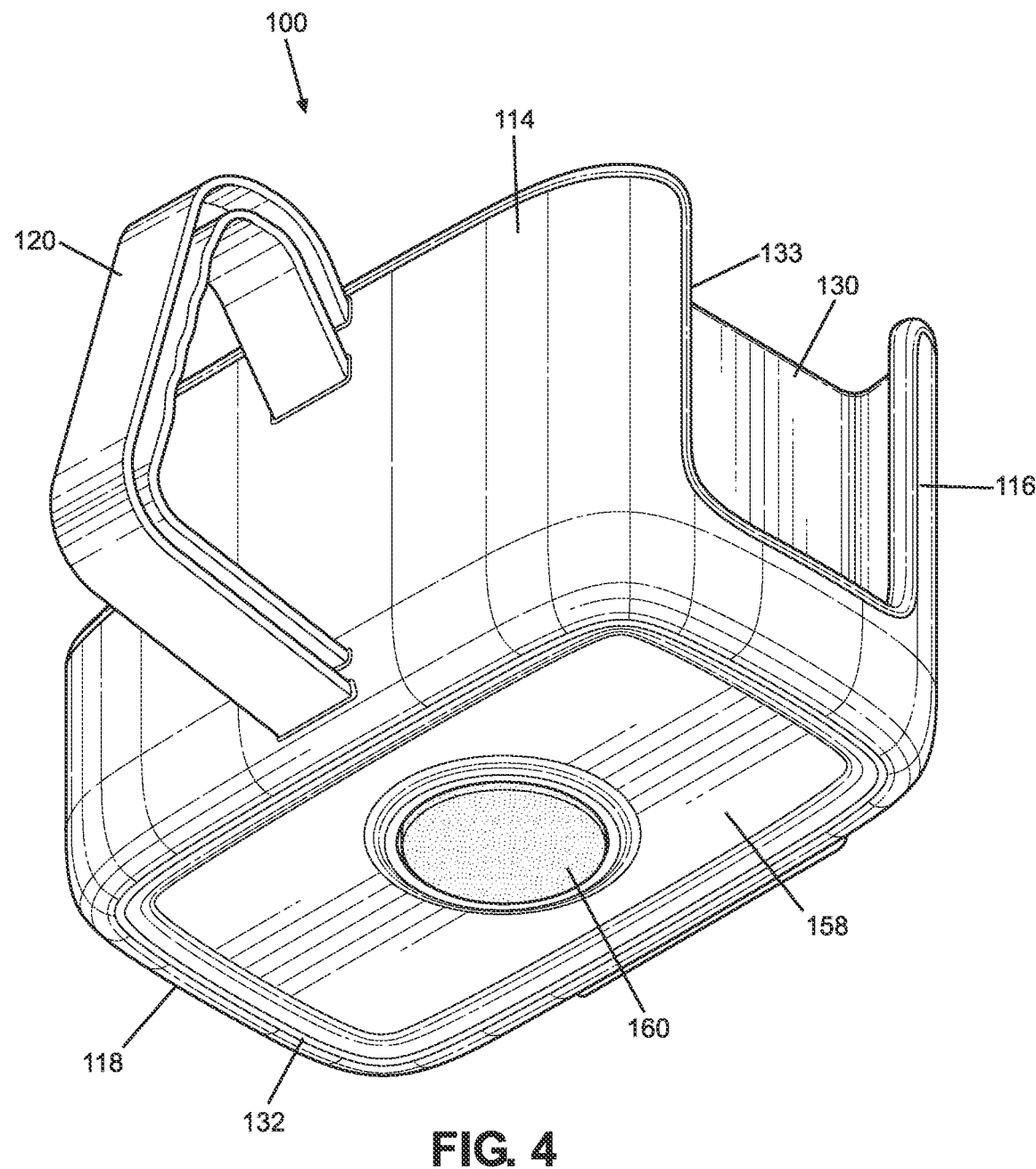
FIG. 4 illustrates a magnet provided for the base of a portable accessory holder according to an exemplary embodiment of the present disclosure.

As shown in FIG. 3, the bottom portion 132 can have a base surface 158 with a magnet 160 in the center. This magnet 160 can allow for magnetic attachment of the portable accessory holder 100 to any magnetic surface, such as a pole or gym equipment. As shown in FIG. 4, the magnet 160 can be but is not limited to, a circular magnet. The magnet 160 can have a gripping pad 168, such as a silicon surface, to allow better friction between the magnet 160 and the surface to which it is attached. The magnet 160 can have one or more magnetic elements 162 provided on a surface 166. A screw thread 164 can be provided that can allow the magnet 160 to be screwed within the base surface 158 of the bottom portion 132.

Figure 5:
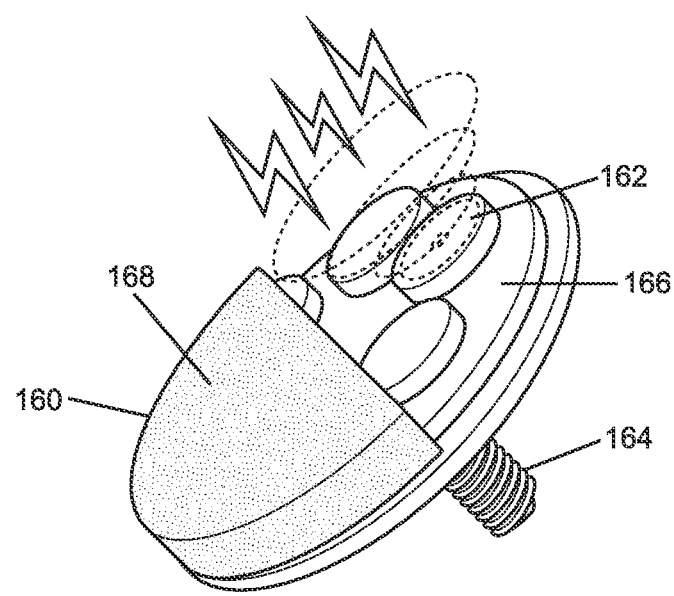
FIG. 5 illustrates a front view of a portable accessory holder according to an exemplary embodiment of the present disclosure.

As shown in FIG. 5, magnetic elements can be added to the three-leaf hinge 140. For example, a magnet 202 is provided on the leaf 142, a magnet 204 is provided on the leaf 144, and magnet 206 is provided on the leaf 146. The magnets can be attached to the leaves by any attachment mechanism, such as screws or glue or other securing mechanism. Different types of magnets can be used. In some exemplary embodiments, channel magnets can be used, such as neodymium rectangular channel magnets. In some exemplary embodiments, the leaves can be made of a magnetic material such that magnets don't need to be included on the leaves.

Figure 6:
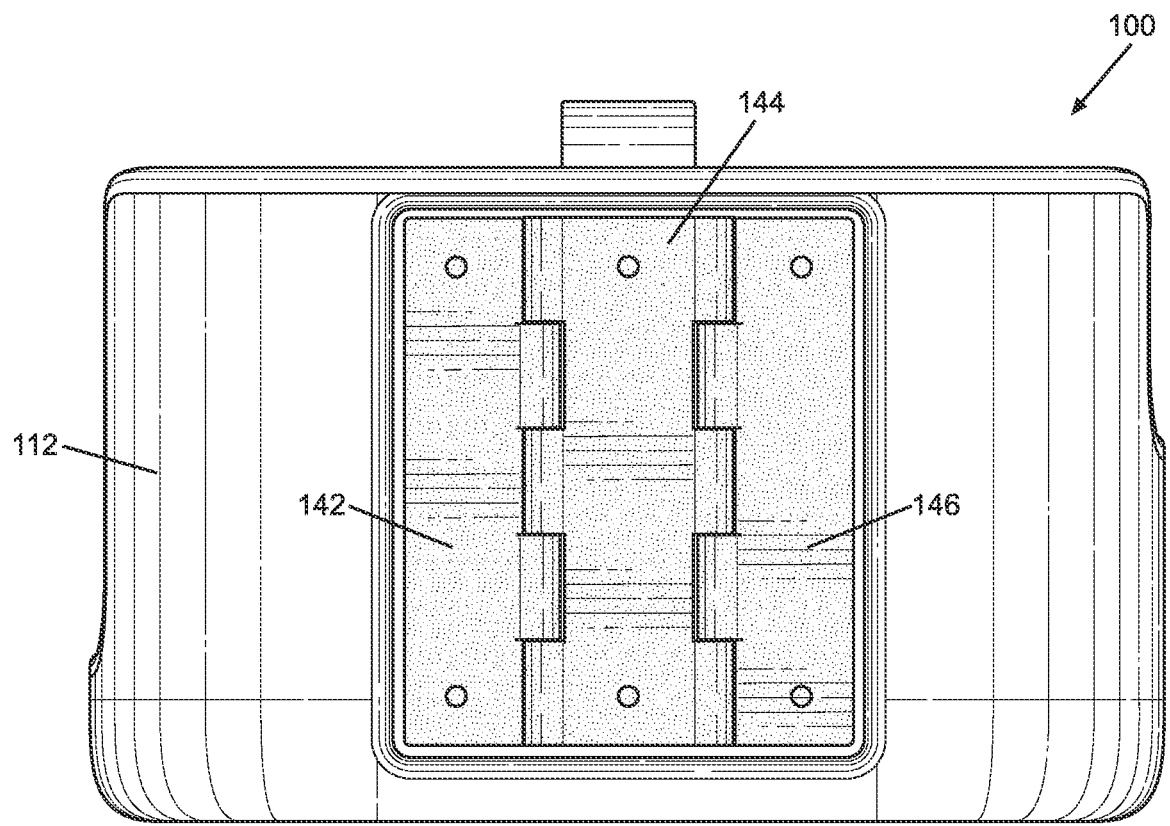
FIGS. 6-7 illustrate magnetic elements for a portable accessory holder according to an exemplary embodiment of the present disclosure.
Figure 7:
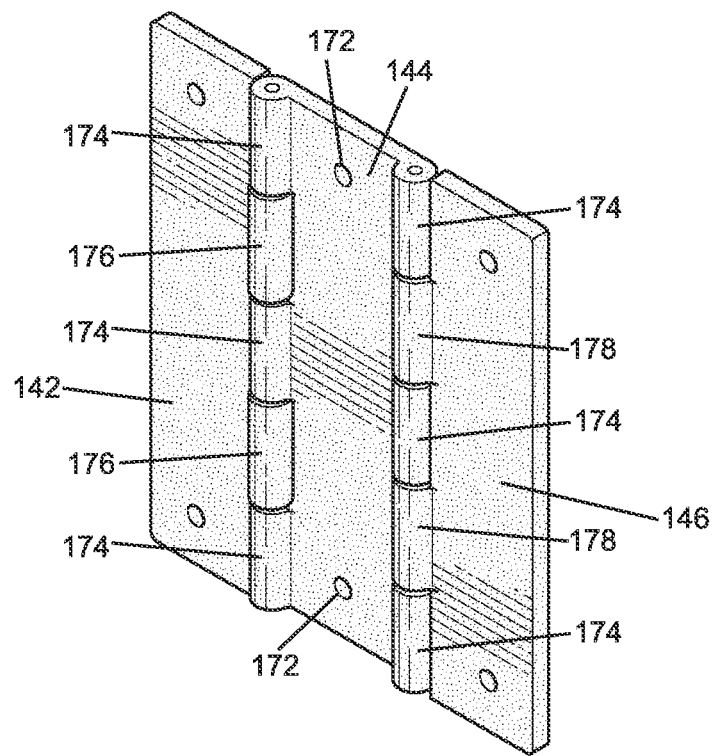

As shown in FIGS. 5-7, screws 208 (e.g., hex screws) can be used to secure the magnet 202 on leaf 142 that extends through the screw holes 172 of the leaf 142. Screws 208 (e.g., hex screws) can be used to secure the magnet 206 on leaf 146 that extends through the screw holes 172 of the leaf 146. The screws 208 on the magnets 202 and 206 do not extend past the back wall 148. Screws 210 can be used to secure the magnet 204 on leaf 144 that extend through the screw holes 172 of the leaf 144. These screws 210 can be longer such that they extend into the back wall 148 within the frame 182, such that the screws 210 secure the hinge 140 to the back wall 148. In some exemplary embodiments, the back wall 148 can have corresponding holes (and internal threads) to the holes 172 of the leaf 144 to receive the screws 210. The screws 210 then secure the magnet 204 to the leaf 144, as well as the hinge 140 to the back wall 148.

FIGS. 6-7 further illustrate the construction of the magnets 202, 204 and 206, and leaves 142, 144 and 146. The leaf 144 can have knuckles 174 on both ends. The leaf 142 can have knuckles 176 that correspond to the knuckles 174 of the leaf 144, such that a pin can connect the leaf 142 and leaf 144 through the knuckles 174 and knuckles 176. The leaf 146 can have knuckles 178 that correspond to the knuckles 174 of the leaf 144, such that a pin can connect the leaf 144 and leaf 146 through the knuckles 174 and knuckles 178. As the leaf 144 is fixed to the wall 148, this allows the leaves 142 and 146 to rotate around the axis of the knuckles with respect to the leaf 144, as shown in FIG. 7.

In some exemplary embodiments, the leaves 142 and 146 are configured to stay flush against the back wall 148, as shown in, e.g., FIGS. 1 and 5. That is, a force can be exerted to press the leaves 142 and 146 against the back wall 148. For example, in some exemplary embodiments, the magnets can be configured such that each of the magnets 202, 204 and 206 have a similar polarity pointing in the same direction. That is, each of the magnets can be configured such that a north pole is facing outward and a south pole is facing inward towards the back wall. Alternatively, the magnets can be configured such that a south pole is facing outward and a north pole is facing inwards towards the back wall. Because of the repelling nature of the magnets, the magnets 202 and 206 will repel against the magnet 204, causing the leaves 142, 146 to rotate inward toward the front portion of the housing, causing the leaves to stay flush against the back wall 148.

In some exemplary embodiments, the hinge 140 can be a spring-loaded hinge (similar to a self-closing door hinge), such that leaves 142 and 146 stay flush against the back wall 148 as shown in, e.g., FIGS. 1 and 5. The spring mechanism can be provided between the connections of the leaf 142 to leaf 144, and the leaf 146 to leaf 144. The three-leaf spring loaded hinge 140 allows the magnets 202, 206 and leaves 142, 146 to stay flat against the back wall 148.

In some exemplary embodiments, the leaves 142, 144 and 146 can be magnetic such that magnets are not needed. The leaves can have a polarity orientation similar to the magnets as described above, such that the leaves 142 and 146 stay flush with the back wall 148. In some exemplary embodiments, the back wall 148 can be magnetic.

Figure 8:
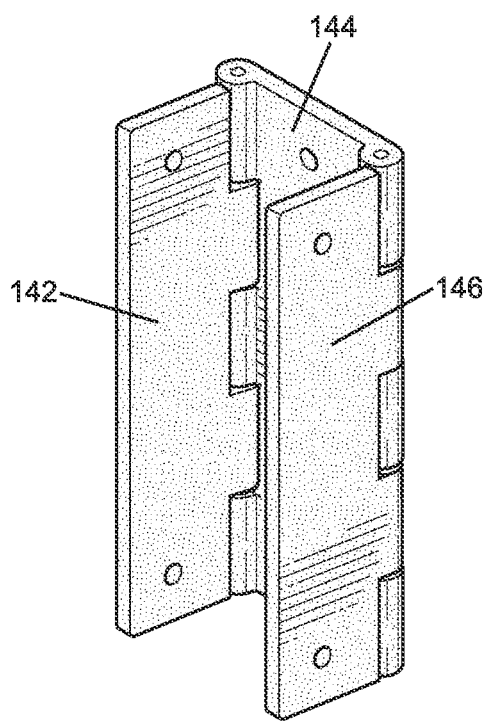
FIG. 8 illustrates a front top perspective view of a portable accessory holder in use according to an exemplary embodiment of the present disclosure.

The magnets 202, 206 and leaves 142, 146 are shown extended in FIGS. 2 and 7-8. As shown in FIG. 8 in a position of use, when the portable accessory holder 100 is held against a magnetic surface, such as a metal pole 150, the magnetic attraction of the magnets 202, 204 cause the leaves 142, 146 to protrude outward and clamp onto the sides of the metal pole 150. That is, the magnetic attraction of the magnets 202, 204 to the magnetic surface 150 overcomes the polarity repelling nature of the magnets 202 and 204 to magnet 206. In embodiments where the leaves 142, 144 and 146 are magnetic and have a similar polarity orientation as the magnets as described above, the magnetic attraction of the leaves 142, 144 to the magnetic surface 150 overcomes the polarity repelling nature of the leaves 142 and 146 to leaf 144. When a spring-loaded hinge is used, the magnetic attraction of the magnets 202, 204 to the magnetic surface 150 overcomes the force of the spring-loaded hinge 140 because the magnetic attraction force is greater than the force of the spring-loaded hinge 140 (i.e., the spring between the leaves 142 and 144, and the spring between the leaves 144 and 146). In embodiments where the back wall 148 is magnetic, the magnetic force of the leaves 142 and 146 to a metal pole 150 can be greater than the magnetic force between the leaves 142 and 146 and the back wall 148, causing the leaves 142 and 146 to rotate and connect to the pole 150. This magnetic force secures the portable accessory holder 100 to the pole 150. When a user pulls the portable accessory holder 100 off the pole 150, the leaves would again lay flat against the back wall 148.

Figure 9:
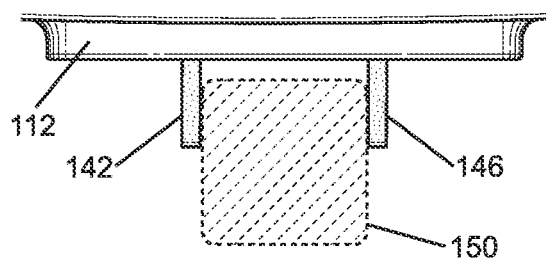
FIGS. 9-10 illustrate the magnets of a portable accessory holder attached to a surface according to an exemplary embodiment of the present disclosure.
Figure 10:
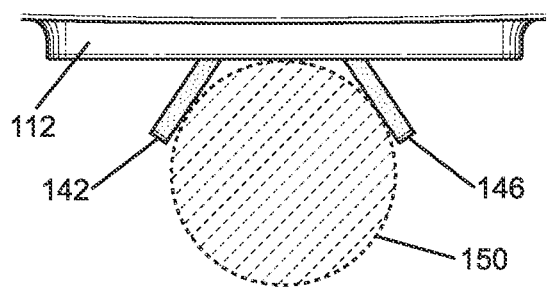
Figure 11:
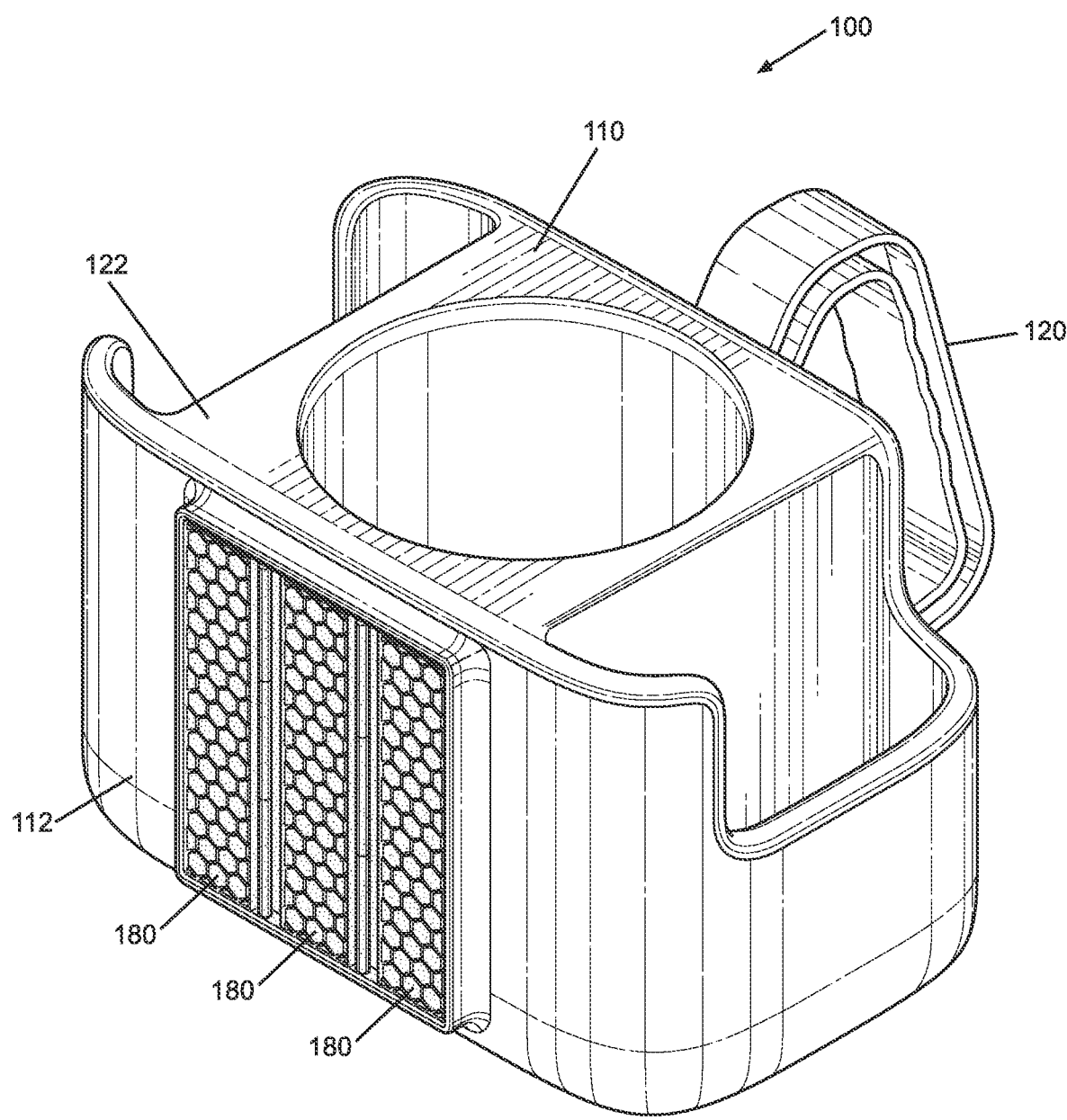
FIG. 11 illustrates padding provided on the magnets of a portable accessory holder according to an exemplary embodiment of the present disclosure.

As shown in FIGS. 9-10, the construction of the leaves 142, 144 and 146 allow the portable accessory holder 100 to attach to metal poles of various shapes, such as a square cross-sectional shape as shown in FIG. 9, or a circular cross-sectional shape, as shown in FIG. 10. As shown in FIG. 11, in some exemplary embodiments, the magnets 202, 204 and 206 can have a rubber padding cover 180, such as silicone, to provide friction for extra grip to a surface. In such embodiments, because the magnets 202, 204 and 206 aren't exposed, and are enclosed in a rubber (or other) coating, it can contribute to the durability of the portable accessory holder 100 as well as increase the friction between the portable accessory holder 100 and the surface it's attached to, so the product doesn't slide down under the pull of gravity.

Various other considerations can also be addressed in the exemplary applications described according to the exemplary embodiments of the present disclosure. For example, various materials may be used to construct the elements described in the figures. Various types of magnets can be used. Various sizes of the elements can also be provided for various sizes of the product. For example, the cavity for the drink holder can be smaller or bigger, as can the size of the compartment for the mobile device. The exemplary embodiments of the present disclosure allow for a magnetic attachment holder that is portable and can easily be attached to metal poles (e.g., exercise equipment).

Various advantages can be provided by the exemplary embodiments of the present disclosure. The exemplary embodiments of the present disclosure allow for a portable accessory holder that a user can bring with them to, e.g., a gym, and place their items (i.e., keys, wallet, water, phone) in the portable accessory holder. This can be placed on top of any metal equipment and held there (through the magnet on the bottom), or placed against any metal pole that is part of any exercise equipment the user is using. It can easily attach and detach as the user uses different equipment. The product is able to hold different types of objects in its various compartments and has capabilities to be magnetically attached to metal surfaces through the magnets. A user can place their mobile device, water battle and other miscellaneous items in corresponding compartments and while holding the device by the handle, attach it to any metal surface. By magnetic force, the product will attach to said surface and stay attached there until pulled away to overcome the strength of the magnets.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure.

What is claimed is:

1. An apparatus comprising:
a housing having a top portion, a bottom portion, a front portion, a rear portion, a first side and a second side; and
a hinge provided on the front portion, the hinge comprising:
a first leaf secured to the front portion of the housing, the first leaf having a first side and a second side opposite the first side;
a second leaf rotatably secured to the first side of the first leaf, the second leaf including a magnet, the second leaf being configured to rotate away from the first leaf and against the front portion of the housing; and
a third leaf rotatably secured to the second side of the first leaf, the third leaf including a magnet, the third leaf being configured to rotate away from the first leaf and against the front portion of the housing;
wherein the magnet on the second leaf and the magnet on the third leaf cause the second leaf and third leaf to rotate outward and away from the front portion of the housing when the first leaf is placed against a magnetic surface.

2. The apparatus of claim 1, further comprising:
a magnet provided on the first leaf.

3. The apparatus of claim 2, further comprising:
one or more screws to secure the magnet on the second leaf to the second leaf; and
one or more screws to secure the magnet on the third leaf to the third leaf.

4. The apparatus of claim 3, further comprising:
one or more screws to secure the magnet on the first leaf to the first leaf and secure the hinge to the front portion of the housing.

5. The apparatus of claim 2, wherein the magnets on the first leaf, second leaf and third leaf are provided in a similar polarity orientation with respect to the front portion of the housing, such that the magnet on the second leaf and third leaf is repelled against the magnet on the first leaf.

6. The apparatus of claim 5, wherein the magnets on the first leaf, second leaf and third leaf are each orientated such that a north polarity faces outward and a south polarity is facing the front portion of the housing.

7. The apparatus of claim 5, wherein the magnets on the first leaf, second leaf and third leaf are each orientated such that a south polarity faces outward and a north polarity is facing the front portion of the housing.

8. The apparatus of claim 5, wherein when the first leaf is placed against a magnetic surface, the magnetic attraction of the magnet on the second leaf and the magnet on the third leaf to the magnetic surface causes the second leaf and third leaf to rotate outward and away from the front portion of the housing, securing the apparatus to the magnetic surface.

9. The apparatus of claim 2, further comprising:
a first spring-loaded mechanism provided between the first leaf and second leaf configured to rotate the second leaf inwards toward the front portion of the housing; and
a second spring loaded mechanism provided between the first leaf and the third leaf configured to rotate the third leaf inwards toward the front portion of the housing.

10. The apparatus of claim 9, wherein the magnet on the second leaf and the magnet on the third leaf cause the second leaf and third leaf to rotate outward and away from the front portion of the housing when the first leaf is placed against a magnetic surface.

11. The apparatus of claim 10, wherein when the first leaf is placed against a magnetic surface, the magnetic attraction of the magnet on the second leaf to the magnetic surface is greater than the force of the first spring-loaded mechanism, and the magnetic attraction of the magnet on the third leaf to the magnetic surface is greater than the force of the second spring-loaded mechanism, causing the second leaf and third leaf to rotate outward and away from the front portion of the housing, securing the magnet on the second leaf and the magnet on the third leaf to the magnetic surface.

12. The apparatus of claim 1, further comprising:
a first compartment provided on the first side of the housing; and
a second compartment provided on the second side of the housing.

13. The apparatus of claim 12, further comprising:
a recess on the top portion of the housing configured to receive a beverage container.

14. The apparatus of claim 13, further comprising:
a handle secured to the rear portion of the housing, the handle configured to lift the apparatus.

15. The apparatus of claim 1, further comprising:
a frame provided around the hinge that is raised outward from the front portion of the housing such that the hinge is recessed within the frame.

16. The apparatus of claim 1, further comprising:
a magnet threadably connected to the bottom portion of the housing.

17. The apparatus of claim 1, further comprising:
a rubber padding provided around the magnet on the second leaf and the magnet on the third leaf.

* * * * *